United States Patent [19]
Long

[11] 3,716,292
[45] Feb. 13, 1973

[54] FILM ADVANCING DEVICE

[75] Inventor: Larry K. Long, Tempe, Ariz.

[73] Assignee: Advance Management Engineering & Research Co., Phoenix, Ariz.

[22] Filed: Nov. 16, 1970

[21] Appl. No.: 89,602

[52] U.S. Cl. .................353/91, 352/225, 353/95
[51] Int. Cl. .....................G03b 1/48, G03b 21/14
[58] Field of Search ............353/68, 91, 95; 352/225; 242/205

[56] References Cited

UNITED STATES PATENTS

| | | | |
|---|---|---|---|
| 3,418,045 | 12/1968 | Rovsek | 353/95 |
| 2,005,759 | 6/1935 | Slaughter | 353/91 |

*Primary Examiner*—Leonard Forman
*Assistant Examiner*—Steven L. Stephan
*Attorney*—Semmes, David H.

[57] ABSTRACT

A film advancing device of the type used for advancing an endless film in single or multiple frame increments. The device includes a solenoid assembly and indexing plate which blanks out the film during its movement or drive and indexes the film in alignment with the projection lamp, as the desired frame is positioned.

The device is particularly adaptable to the programed advance of films, containing a plurality of questions which are projected for manual or computer answer by a student, medical patient, or the like.

8 Claims, 4 Drawing Figures

INVENTOR
LARRY K. LONG

BY David H. Semmes
ATTORNEY

INVENTOR
LARRY K. LONG

BY
ATTORNEY

FILM ADVANCING DEVICE

BACKGROUND OF THE INVENTION

1. Field of the Invention

In the medical sciences, a great deal of recent attention has been given to the use of computers and film projection devices in taking the medical history of the patient. This eliminates the necessity for the physician's or medical attendant's time-consuming interrogation of the patient. For example, photo slides or a film strip may be employed to project general health history questions on the wall, while the patient enters his answers upon a printed sheet, keyed to the questions, or punches an appropriate answer in a digital input station attached to a computer. As a result, the question and answers are reconciled within the computer, and the attending physician is presented automatically with a computer printout, constituting the patient's medical history. A typical question might be:

Question 23. Have you ever had tuberculosis?
Answer: (a) yes; (b) no.
Question 24. Do you have any difficulty sleeping?
Answer (a) yes; (b) no.

2. Description of the Prior Art

Some recent attention has been given to the use of audio tapes or film slides for presenting the questions to the patient. However, no especial attention has been given to the indexing of the film not providing a mechanism for blanking out the film, while it is being advanced from one frame to another for presentation of different questions.

SUMMARY OF THE INVENTION

According to the present invention, the film is in the form of an endless strip, mounted upon a plurality of rollers and intersected by a projection lamp and a film indexing device. The indexing device includes an actuator keyed to the film stepper drive motor and abutting an indexing plate. The index plate itself has a film aperture aligned with the projection lamp, such that the question is projected through the index plate onto a screen in the patient-questioning center.

A solenoid is employed to reciprocate the actuator as the patient answers a question. As a result, the film indexing device is pivoted laterally away from the film and the stepper drive motor advances the film strip the desired increment for projection of another question. As the drive motor stops, the indexing plate is returned to engage the film, centering the film in alignment with the projection lamp and the aperture in the indexing plate. The solenoid may be keyed to the patient's answer, such that, as each question is answered, the solenoid reciprocates the actuator and the stepper drive motor causing film to advance to next medical question.

Figure 1:
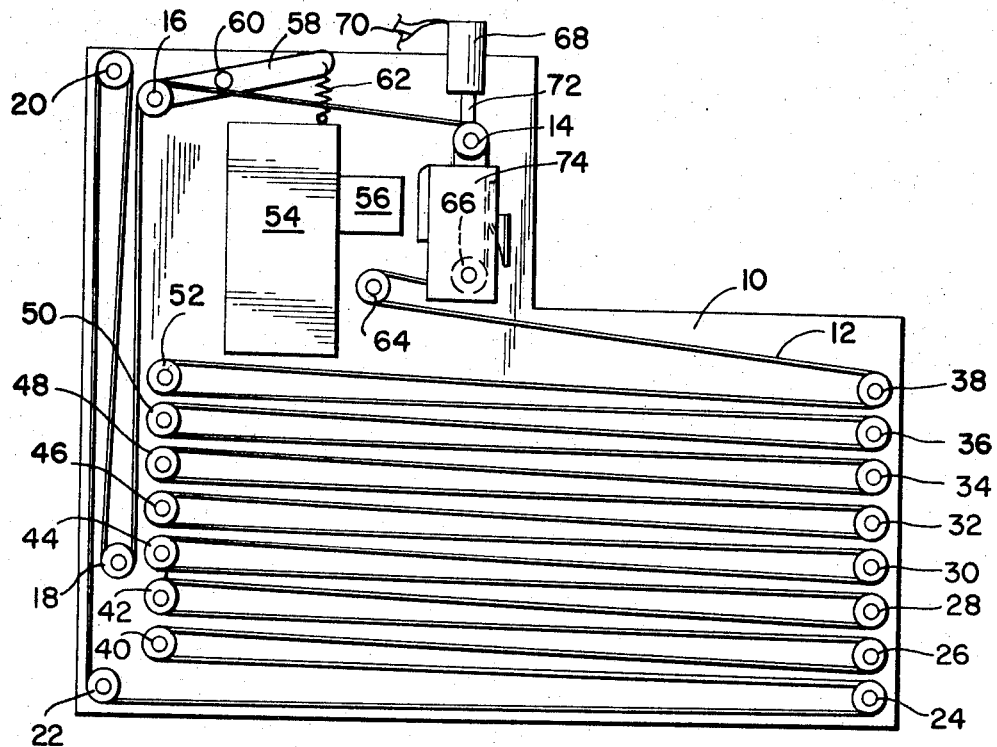
FIG. 1 is a front elevation showing a back-up plate supporting an endless film strip, a projection lamp, and the actuator-indexing device.
Figure 2:
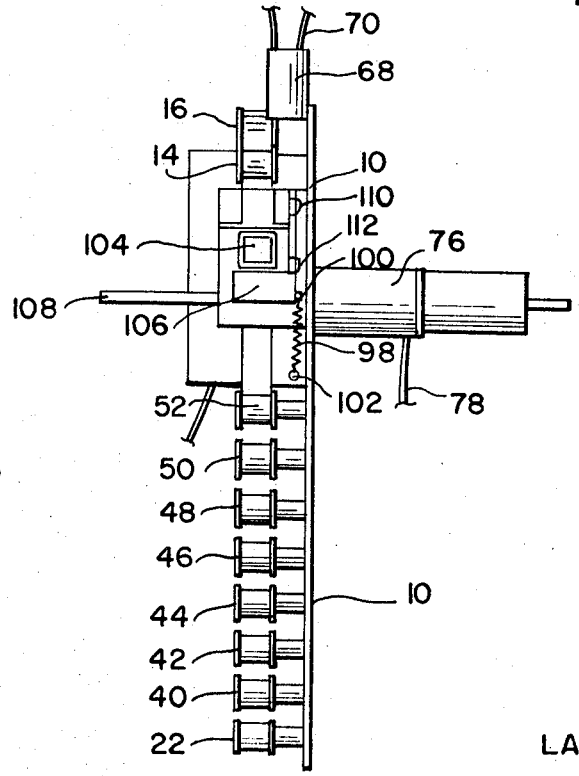
FIG. 2 is a side elevation, showing the indexing plate aperture aligned with the projection lamp.

DESCRIPTION OF THE PREFERRED EMBODIMENTS:

In FIG. 1, the back-up plate 10 is shown as supporting an endless film strip 12 by means of a plurality of idler rollers 14, 16, 18, 20, 22, 24, 26, 28, 30, 32, 34, 36, 38, 40, 42, 44, 46, 48, 50, 52, and 64. Idler roller 16 may be mounted at one end of a lever arm 58, pivoted as at 60 and including a tension-return spring 62, so as to tension the entire film strip. Drive roller 66 embodying a plurality of teeth 65 is supported upon motor 76 drive shaft 108. Motor 76 may be driven through electrical power connection 78.

Figure 3:
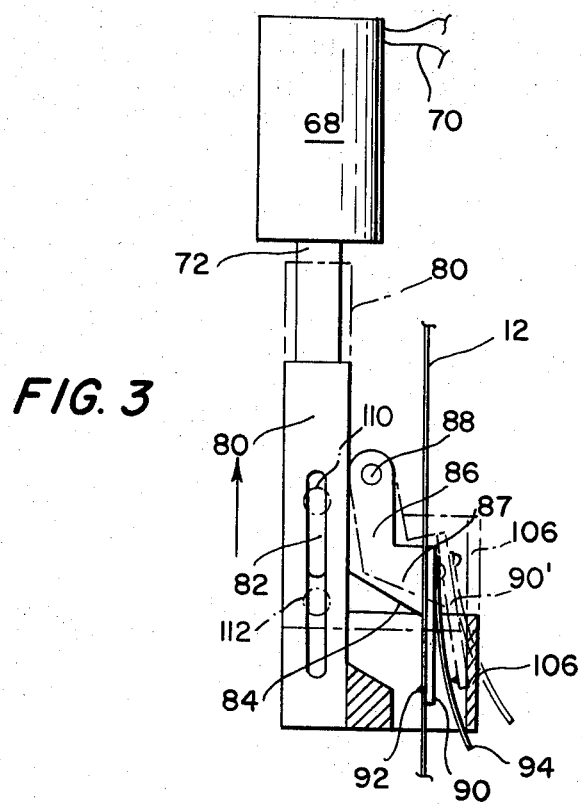
FIG. 3 is an enlarged fragmentary section, showing the solenoid-activated actuator and the pivoted indexing plate.

The indexing block 74 includes, as illustrated in FIG. 3, an actuator 80 connected to solenoid 68 by means of solenoid shaft 72. The solenoid may be powered by electrical connections 70. The actuator 80 includes an elongate slot 82 through which bolts 110 and 112 extend, so as to support the actuator in the block. The actuator has a forward camming shoulder 84 and a front shutter closing plate 106. Intermediate camming shoulder 84 and 106 there is defined a film and index plate passageway. A return spring 98 at one end may interconnect stud 100 mounted upon the shutter plate 106 and at its other end a set screw 102 or the like extending into the block. The index plate 86 is pivoted within the block at shaft 88 so as to pivot laterally with respect to film 12 within the confines of the front shutter plate 106 and film 12. The indexer includes plate 90 having a medial film aperture 104 and an indexing tip or pin 92 which engages the conventional perforation in the side of the film. A hold-down spring 94 may be secured to the indexing plate top, so that its free end abuts the shutter plate bottom 106. This spring 94 pressurizes the index plate against the film.

Figure 4:
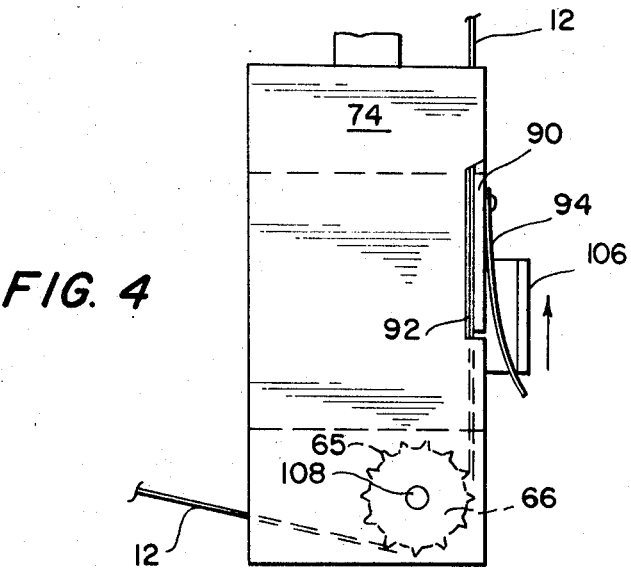
FIG. 4 is a fragmentary side elevation of the indexing block.

As illustrated in FIGS. 3 and 4, the upward lifting of the actuator 80 upon the reciprocation of solenoid plunger 72 causes actuator camming surface 84 to engage index camming surface 87 and thereby pivot indexing plate 90 laterally, outwardly of the film. The uplifted position of the actuator 80 and the pivoted position of the indexing plate 90' are illustrated in phantom in FIG. 3. As the actuator is thus lifted and the indexing plate pivoted, the film drive motor 76 may be synchronized to advance the film the desired increment. Simultaneously, plate 106, in the position indicated in phantom in FIG. 3, blanks out the projection lens 56 mounted adjacent light source 54. As the drive motor completes the desired film advance, the solenoid may release actuator, permitting return spring 98 to pull actuator 80 downwardly, so that indexing pin 92 engages the film and registers the film with the projection lamp. The desired question or other matter will then be projected via lens 56 and through film aperture 104.

Manifestly, various means may be employed for tensioning and driving the film without departing from the spirit of the invention.

I claim:
1. A film advancing device comprising:
   A. a backing plate;
   B. a plurality of idler rollers and at least one drive sprocket mounted upon shafts secured in said plate;

C. a film supported upon said rollers and said sprocket, so as to be advanced across said backing plate;
D. a drive motor secured to said backing plate and including a shaft extending transversely therethrough to engage and drive said drive sprocket;
E. a projection lamp supported upon said backing plate, so that its optical axis intersects said film;
F. a film index device supported upon a block secured to said backing plate and including;
  i. a solenoid having a reciprocable shaft;
  ii. an actuator secured to said shaft to reciprocate therewith, and including a cam surface and a blanking surface alignable with the optical axes of said projection lamp, so as to blank out said film during advancement of said film; and
  iii. an index plate pivotally secured to said backing plate and having a film indexing pin, a spring attached to said index plate being engaged with said blanking surface to bias said index plate so that said index pin is in turn biased into engagement with said film and a complementary cam surface arranged, so that said index complementary cam surface engages said actuator cam surface, such that reciprocation of said actuator removes said indexing pin from said film, permitting advance of film by said drive motor.

2. A film advancing device, as in claim 1, said indexing plate including a film projection aperture aligned with the optical axis of said projector lamp.

3. A film advancing device as in claim 2, including a return spring connected to said backing and interconnecting said backing plate and said actuator, so as to return said actuator to film projection position.

4. A film advancing device as in claim 3, at least one of said idler rollers being supported upon a pivoted, spring-tensioned lever, so as to tension said film during advancing.

5. A film advancing device as in claim 4, said drive motor being synchronized with said solenoid such that said film is advanced as said actuator is reciprocated to remove said index plate from said film.

6. A film advancing device as in claim 5, said index plate being supported for longitudinal pivoting in a forward portion of said actuator device.

7. A film advancing device as in claim 6, said actuator device encompassing on all sides said film and said index plate.

8. A film advancing device as in claim 7, the shutter blanking portion of said actuator device being presented forwardly of said index plate.

* * * * *